United States Patent [19]
Mottola

[11] Patent Number: 6,024,381
[45] Date of Patent: Feb. 15, 2000

[54] SIMULATOR FOR TEACHING VEHICLE SPEED CONTROL AND SKID RECOVERY TECHNIQUES

[76] Inventor: Frederik R. Mottola, 390 Mapel Ave., Cheshire, Conn. 06410

[21] Appl. No.: 08/846,854

[22] Filed: May 1, 1997

Related U.S. Application Data

[63] Continuation-in-part of application No. 08/255,172, Jun. 7, 1994, Pat. No. 5,626,362.

[51] Int. Cl.[7] .................................................. B62D 63/00
[52] U.S. Cl. ......................................... 280/767; 280/80.1
[58] Field of Search .................................... 180/198, 209, 180/21, 210; 280/91, 767, 80.1, 86, 86.1, 86.5; 301/5.1; 16/35 R, 35 D

[56] References Cited

U.S. PATENT DOCUMENTS

| | | | |
|---|---|---|---|
| 4,449,727 | 5/1984 | Roos | 280/91 |
| 4,678,197 | 7/1987 | Stein | 280/80.1 |
| 4,700,798 | 10/1987 | Johansson et al. | 180/209 |
| 4,998,594 | 3/1991 | Orloski | 180/198 |

*Primary Examiner*—Kevin Hurley

[57] ABSTRACT

An apparatus with a tire that is capable of castering 360 degrees replaces the rear wheels of a front wheel powered automotive vehicle to give drivers an educational experience that simulates the effects excessive speed has upon entry into curves and turns. The rear wheels can remain locked in a non-castering position, whereby the vehicle will perform in a conventional manner. However, under the control of an instructor, the lock can be removed to free the casters, causing the rear of the vehicle to move in the opposite direction from the steering input to simulate a rear wheel skid. When the vehicle on which the invention is mounted is being driven in a straight path the freely castering rear wheels will trial in a straight path. When there is a change in lateral position, such as that which occurs when entering a curve or making a turn, the rear castering wheels will continue to travel in a straight direction causing a lateral acceleration resulting in a rear yaw. The lateral acceleration, or yaw rate, will increase in proportion to the vehicle's velocity and the rate of change in lateral positioning. Therefore, with the invention apparatus and a designed series of learning activities, a trainee can readily experience the effect speed has upon one's ability to control the vehicle when there is a change in lateral positioning.

18 Claims, 10 Drawing Sheets

000000000
SIMULATOR FOR TEACHING VEHICLE SPEED CONTROL AND SKID RECOVERY TECHNIQUES

This is a continuation-in-part of application(s) Ser. No. 08/255,172 filed on Jun. 7, 1994 U.S. Pat. No. 5,626,362.

BACKGROUND OF THE INVENTION

1. Field of the Invention

There is a need to provide automobile drivers with an opportunity to experience the effect velocity has upon one's ability to control a vehicle during entry into curves and turns. Many sources of research have revealed than motor vehicle crashes are the leading cause of death among teenagers, and teenage drivers tend to be at fault for their car crashes more often than older drivers. Speeding over allowable limits, or too fast for road conditions and other high risk behaviors are several of the key causes for this tragic loss of young drivers and passengers. There is a need to reinforce current training programs and to make advanced training and remedial driver education available as part of the means to reduce the crash incidents of the youthful driver. Other research has documented that the largest percentage of single vehicle crashes involving the youthful driver occurs at a curve in the roadway. Being that the leading cause of single vehicle crashes for youthful drivers involves excessive speed while entering a curve, effective learning activities are needed to have the driver experience the importance of establishing speed control prior to entering a curve.

Heretofore, the most common method for teaching the consequences that occur when a vehicle's handling dynamics exceed the roadway's traction envelope is to conduct a classroom activity. The principal disadvantage of such classroom training is the absence of a visceral experience. The best audio-visual aids, in supplement to a classroom lecture, cannot give a trainee an emotional experience of what it feels like to lose control of a vehicle when the speed of entry into a curve is one mile per hour faster than the traction envelope necessary for tire adhesion. Only a small percentage of drivers experience, during an educational environment, the effect speed has upon the handling qualities of a motor vehicle. The current state of the art, for those programs that do include hands-on-training, is usually achieved by flooding a large level asphalt-surfaced parking lot, or a dedicated location designed for such training, with water or other friction-reducing materials. The speeds at which these exercises are conducted, to generate a sufficient skid, take place in excess of thirty-five miles per hour. With constant lateral acceleration forces being placed upon the vehicle, there is an excessive amount of stress on the transmission, rear axle, braking system, tires, and steering system of the vehicle. Therefore, the cost of a dedicated vehicle for the training, the expense of maintaining the training car, the requirements of a large paved area, the need for a flat surface, the resistance from neighbors complaining about the noise of screeching tires, the amount of time to set-up and remove the training exercises, all contribute to make this experience costly and geographically prohibitive to the vast majority of drivers. In particular, the newly licensed and youthful driver is most often the able to receive such training.

2. Description of the Prior Art

U.S. Pat. No. 4,449,727 discloses a front wheel drive automobile vehicle with pivotable rear wheels having up to a 10 degree caster for the purpose of teaching race car drivers skid control. U.S. Pat. No. 4,700,798 and U.S. Pat. No. 4,998,594 disclose driver training apparatus for stimulating automotive skidding conditions. Both latter patents disclose a frame upon which are attached four castering wheels which are spaced wider than an automotive vehicle. An automotive vehicle is mounted on top of the frame. U.S. Pat. No. 4,700,798 disclosed that the frame is elevated or lowered by the up or down movement of a hydraulic cylinder to put more or less of the vehicle's tires in contact with the road surface by shifting the load more or less onto the castering wheels. As the frame is elevated the automobile's tires are less in contact with the road surface, therefore stimulating a reduced-traction condition. U.S. Pat. No. 4,998,594 discloses a frame, supported by four castering wheels which raise or lower the four wheels of an automobile in relation to the road surface by the tilting forward and rearward articulating axles upon which the castering wheels are mounted; thereby creating a simulated reduced-traction condition. Neither of the two patents disclose the ability to lock or unlock the swivel action of the caster wheels as means to create a reduced-traction simulated condition in the handling qualities of the vehicle-roadway interaction. Furthermore, none of the cited patents disclose the capability to instantly simulate, within a fraction of a second, the capability to convert the condition that the training vehicle is operating on from an adhesive surface of rolling traction to one of reduced-traction as if the driver suddenly encounters a patch of ice on the roadway surface. A significant disadvantage to these two patents is the high cost of production making it too expensive to be widely adopted in our school systems curriculum for traffic safety education. The massiveness of the apparatus of these patents would reduce the portability of being able to easily and quickly set up activities at a variety of locations in a cost effective manner.

The principal object of this invention is to simulate an automobile being operated in a reduced-traction situation such as that which occurs during excessive speed applications for the condition and configuration of the roadway. Such excessive speed is contributory to vehicular crashes that occur at roadway horizontal curves and complicated during reduced-traction road surface conditions imposed by rain, snow, ice, loose sand and other environmental elements.

Another object of this invention is to teach drivers concepts and skills necessary to recognize the deviation of the vehicle from its longitudinal axis (i.e., it's straight path of travel) early during the commencement of a yaw, enabling drivers to take a corrective steering action before the lateral acceleration exceeds the point of controllability to recover a vehicle's control during a skid situation.

Another object is to provide drivers with opportunities to make risk vs. gain decision as it relates to acceptance of speed and lane position for entering potentially high-risk roadway conditions that occur when the vehicle is cornering.

Still another object is to provide a driver training simulator to give trainees hands-on-experience of how searching techniques affects the control of a vehicle while negotiating a curve or turn.

Yet another object is to provide a driver training-simulator to give trainees hands-on-experience of how to recognize the beginning stage of a skidding action and to know how to make corrections to reduce risk.

And another object is to provide a driver training simulator to give trainees hands-on-experience and to be used as a demonstration of how alcohol affects one's driving performance.

SUMMARY OF THE INVENTION

The present invention is an apparatus that replaces the rear wheels of a front wheel powered automobile vehicle.

There are two independent units of the apparatus which mount to the rear axle of the vehicle in a similar manner as changing a tire. The existing wheel assembly (i.e. tire and rim) of the automobile are removed and replaced with the apparatus of this invention. The mounting plate and supporting brackets for the apparatus are designed to fit the vehicle on which they will be used. Attached to the mounting plate is a pneumatic tire and rim and bearing assembly that is capable of castering 360 degrees.

This invention is distinctive over the aforementioned patents by providing a pair of apparatus assemblies consisting of castering wheels that are mounted to the rear axle of a conventional front wheel drive automotive vehicle. There is a locking device to keep the castering wheels in a fixed position whereby the vehicle will operate in a conventional manner. However, under the control of an instructor, the locking mechanism can be released while the vehicle is driven into a curve or turn configuration define by traffic cones. This provides an instant release of the castering lock which has the same effect upon the vehicle as that which occurs if a driver were to hit a patch of ice while negotiating a curve. Such an experience creates a visceral experience necessary for effective training.

When the vehicle on which the apparatus of the invention is mounted is being driven in a straight path, the freely castering rear wheels will trail in a straight path. When there is a change in lateral position, such as that which occurs when entering a curve or making a turn, the rear castering wheels will continue to travel in a straight direction causing a lateral acceleration resulting in a rear yaw. The lateral acceleration, or yaw rate, will increase in proportion to the vehicle's velocity and the rate of change in lateral positioning. Therefore, with the invention apparatus and a designed series of learning activities, the driver is able to experience the importance of reducing speed as the primary method to avoid losing control of the vehicle, before entering a situation that places a critical demand upon rolling traction to maintain steering control. Such situations primarily occur while entering curves and turns.

The greater the vehicle's speed, the faster the rear of the vehicle will move in the opposite direction. In a parking lot, or other controlled environment, specially designed exercises can be conducted to have a driver trainee experience the effects that an increase in velocity has upon the ability to control a vehicle while negotiating curves and turns; and techniques for recovery of directional control during a skid situation are experienced.

Effective training to provide an emotional experience when going too fast into a curve, or turn, can now be made available to all drivers in an inexpensive way by means of the device in accordance with this invention.

BRIEF DESCRIPTION OF THE DRAWINGS

For the purpose of illustrating the invention, there is shown a preferred configuration. However, it is understood that this invention is not limited to the precise arrangements and instrumentalities as shown.

DESCRIPTION OF THE PREFERRED EMBODIMENTS

Figure 1:
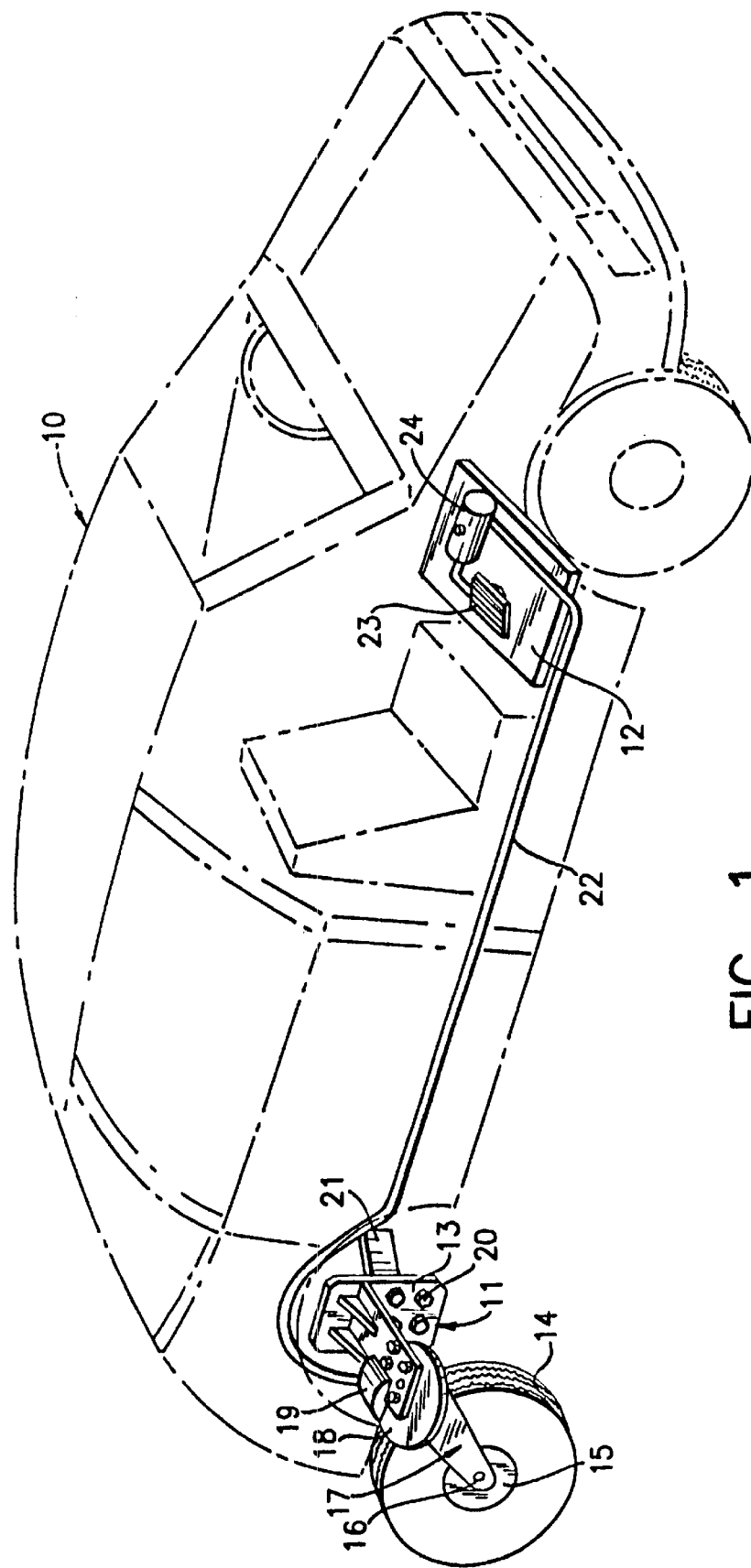
FIG. 1 is a perspective view of the apparatus as mounted on the passenger's side rear axle of a conventional front wheel drive vehicle; the latter is shown with broken lines.

A conventional front wheel drive automobile 10 is shown in FIGS. 1–4 with the castering apparatus 11 mounted with lug nuts 20 up against the rear brake drum 26 on the rear axle 30. A stabilizer bracket 21 connected to the castering apparatus 11 is anchored as at 35 to the automobile's frame 27, and secured by a safety pin 37 through holes 36 in the anchor 35 to prevent the castering apparatus 11 from rotating on the rear axle 30. The instructor is able to prevent the wheel assembly 17 from castering, or restrict the castering action by depressing a break pedal 23 that forces hydraulic fluid from a master cylinder 24 through a flexible fluid line 22 that connects to a conventional brake caliper 19. The brake pedal 23 and a conventional master cylinder 24 are mounted via bolts 64 (FIG. 7) on a portable plate 12 that is placed on the floor of the front passenger side without the need to make any modification to the car 10.

Figure 4:
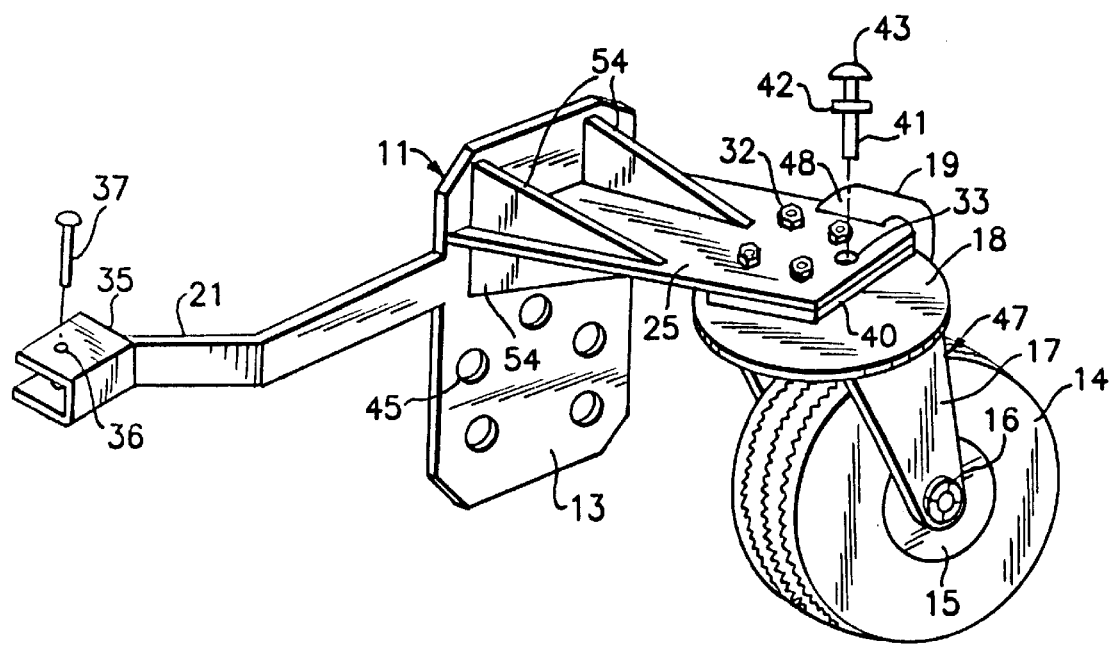
FIG. 4 is a prospective view of the castering assembly designed for the driver's side rear axle.

The castering apparatus 11, as shown in FIG. 4, consists of a mounting plate 13 upon which is bolted as at 32 to a castering wheel 17 which has a pneumatic tire 14 mounted on a rim 15 supported by an axle 16. The wheel assembly 17 which is attached to an angular support frame 47 has a disc 18 attached to receive pressure from a conventional hydraulic brake caliper 19 to stop the castering movement indicated at 31 of the wheel assembly 17. The disc 18 and a top plate 40 have a bearing 39 mounted between them to accommodate the castering load.

Figure 6:
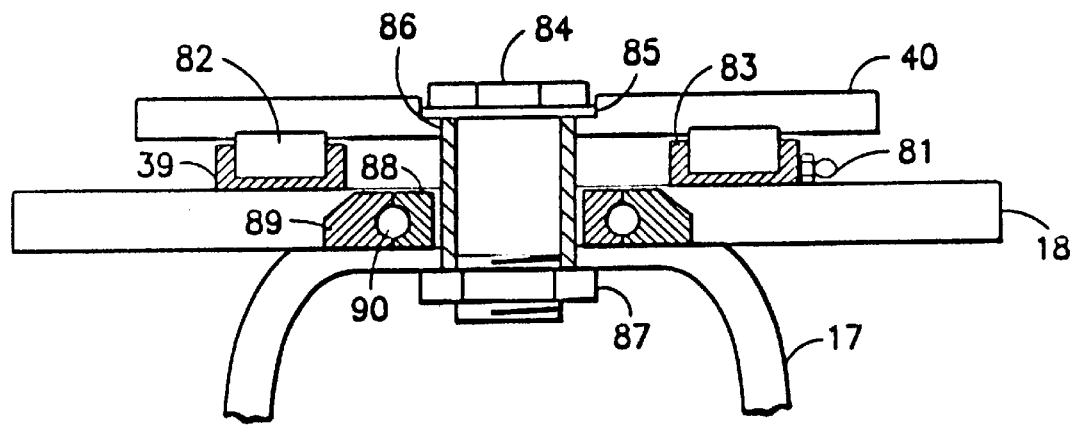
FIG. 6 is a front view of the castering assembly with the bearing component parts being shown in sections.

With the exception of the rotary disc 18, the castering apparatus 11 is conventional and is shown in greater detail in FIG. 6. As shown, the assembly consists of a roller bearing 39 to support vertical thrust with rollers 82 contained in a race 83 with an external lubricant fitting 81. The axial rotation is supported by a ball bearing assembly of an outer race 89 and an inner race 88 containing balls 90. The fixed plate 40 is attached to the castering assembly by means of a bolt 84, spacer washer 85, bushing 86 and a nut 87.

The castering wheel assembly 17 is bolted with four bolts 32 on the horizontal plate 25 which is welded to the mounting plate 13 and reinforced by upper and lower gussets 54. Bolting the wheel assembly 17 to the mounting plate assembly 13 makes it possible to easily adapt the apparatus of the invention to more than one car by attaching the wheel assembly to a new plate assembly 13 that has the hole alignment pattern 45 and the stabilizer bracket 21 designed to fit a second backup car or to fit a replacement car. With a second mounting plate in inventory, a training program can within a matter of a few minutes change the complete assembly from one car to another, eliminating the need to buy a complete unit if one vehicle is not operative.

Figure 2:
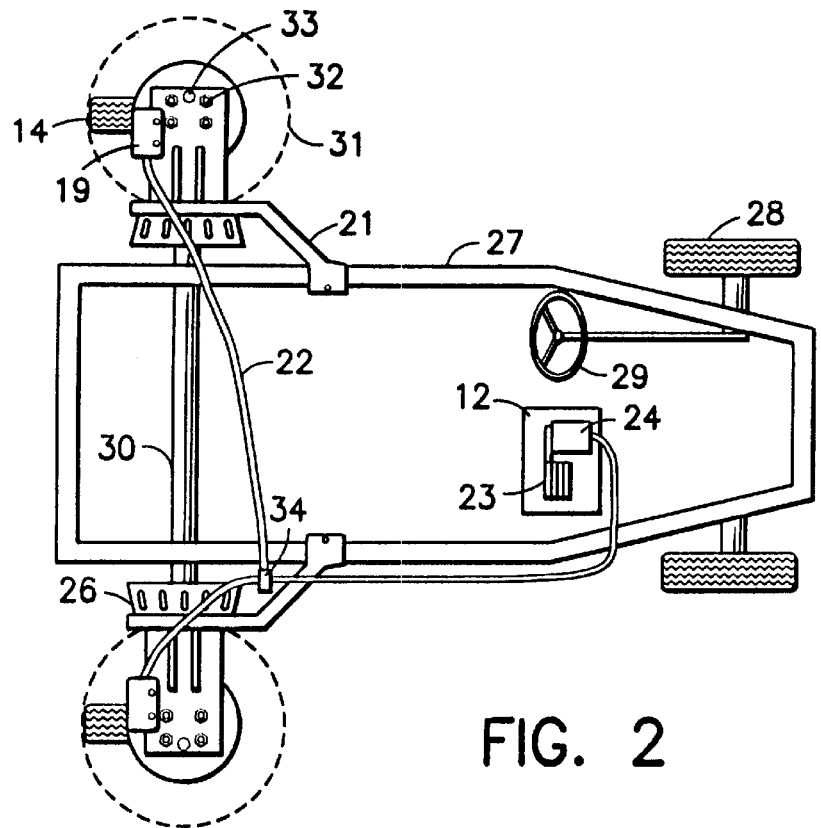
FIG. 2 is a top plan view of the preferred apparatus as mounted on both sides of the rear axle of a conventional front wheel drive vehicle and a locking device, under the instructor's control, to restrict the swivel of the castering action.
Figure 5:
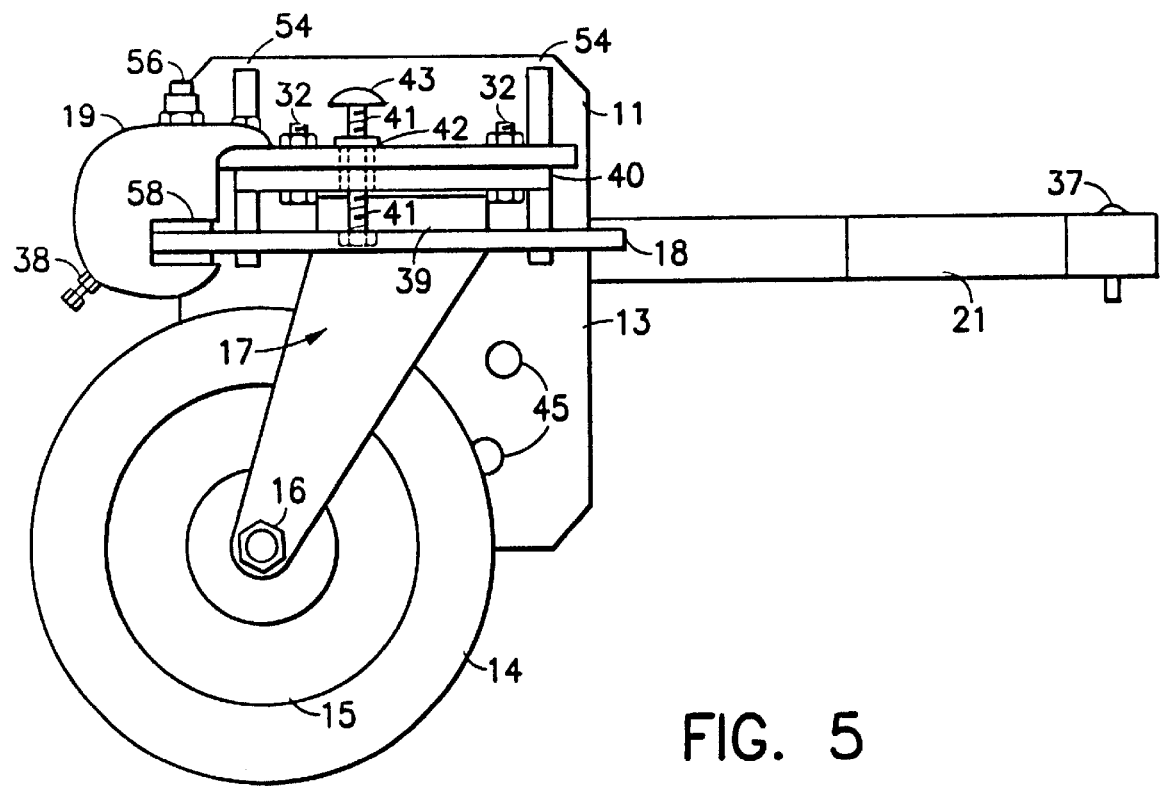
FIG. 5 is a side view of the castering assembly shown in FIG. 4 for the passenger's side.
Figure 7:
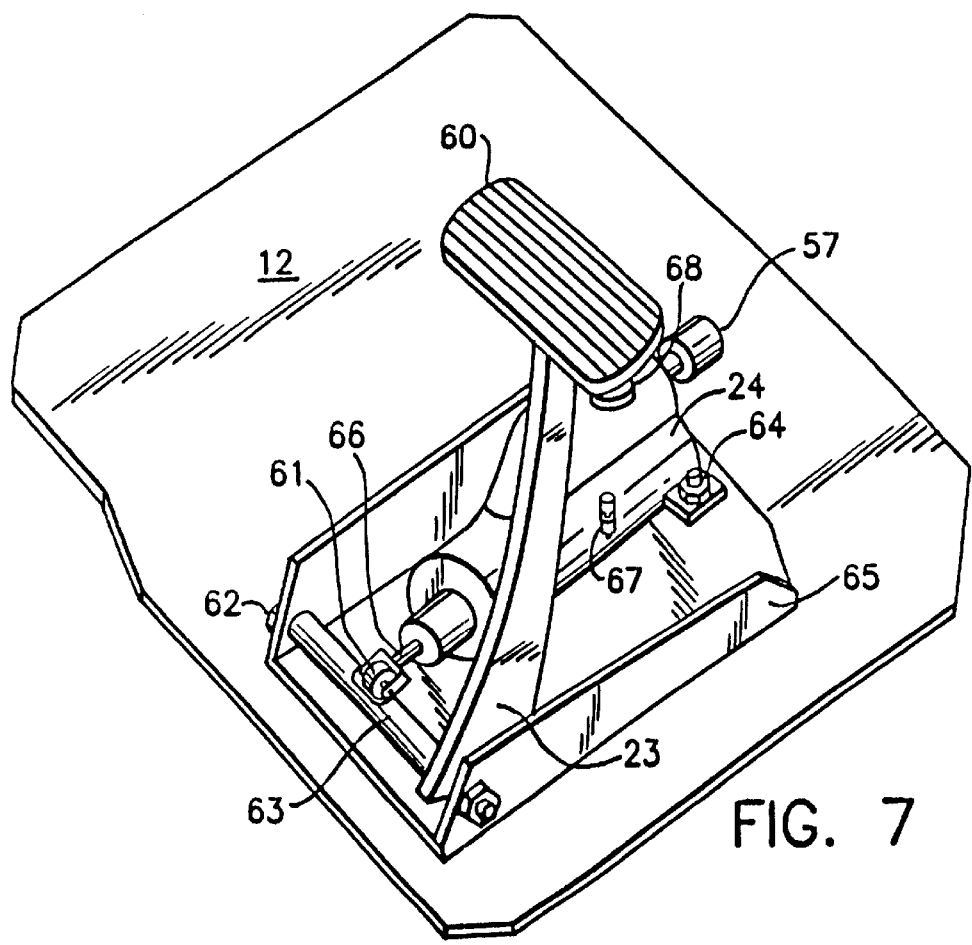
FIG. 7 is a prospective view of the brake pedal and master cylinder.

The hydraulic system, as shown in FIGS. 1, 2 and 5, has fluid lines 22 from the left and right assemblies 11 connected to the caliper 19 by means of a quick connect 56 and formed into one line with a tee connector 34 and connected to the master cylinder 24 by means of a quick connect 57 (FIG. 7). The caliper is attached with a mounting bracket 48 to the horizontal plate 25. With the use of the no-spill quick connect 56, there is a minimum amount of air introduced into the system during disconnection and connection; however, there are bleed valves 38, 67 on the caliper 19 and on the master cylinder 24, respectively. The instructor depresses the brake pedal arm 23, via the brake pad 60, which is attached to a cam shaft 63 that has a cam 61 which pushes in the rod 66 and in a manner known per se puts pressure upon the brake caliper which places the brake pads 58 in contact with the rotary disc 18 to prevent castering of the wheels 17. The caster wheels can also be locked in a fixed position by means of a manual lock pin 41 that is inserted into an aperture 33 in the caster assembly through to the rotary disc 18 to lock the wheel assembly 17 in a straight position. This locking device is helpful when the car needs to be transported from one exercise to another, or when a castering action is not desirable.

Figure 9:
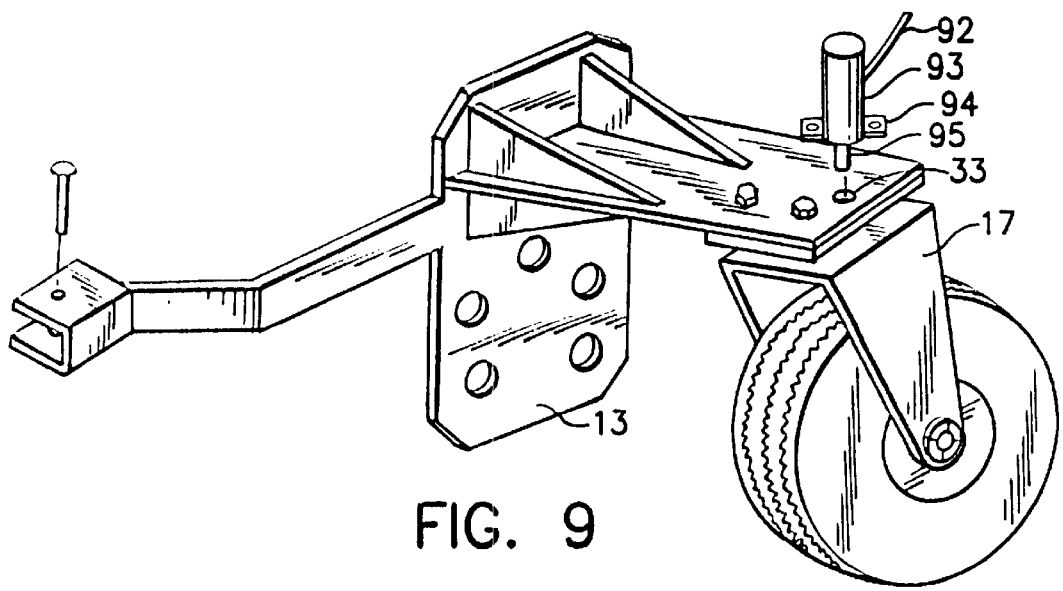
FIG. 9 is a perspective view of the castering assembly showing a solenoid actuated locking device.

Within the scope of this invention, it is possible to provide the desirable results by other than the embodiment described hereinabove. Such variations include, for example, a car equipped with a cable and pulley system whereby the instructor can insert or remove the locking pin 41 by actuating a lever inside the car, much as is known for actuated and releasing a conventional parking brake. The locking and releasing of the caster wheels can also occur by use of electrically powered solenoid 93 having a lead 93, as shown in FIG. 9, which can be mounted as at 94 to the fixed support plate 25 and actuated by a switch under the instructor's control that moves a pin 95 in and out of an aperture 33 or the solenoid can be mounted to move a wedge in or out of a slot on the disc 18, the wedge being anchored to a fixed point to prevent the movement or release of the disc. The hydraulic brake pedal can be replaced with a hand lever or an electrically powered switch to actuate the fluid pressure to act upon the caliper. It is also possible to put and release pressure on the disc 18 by use of a spring and solenoid device.

Figure 8:
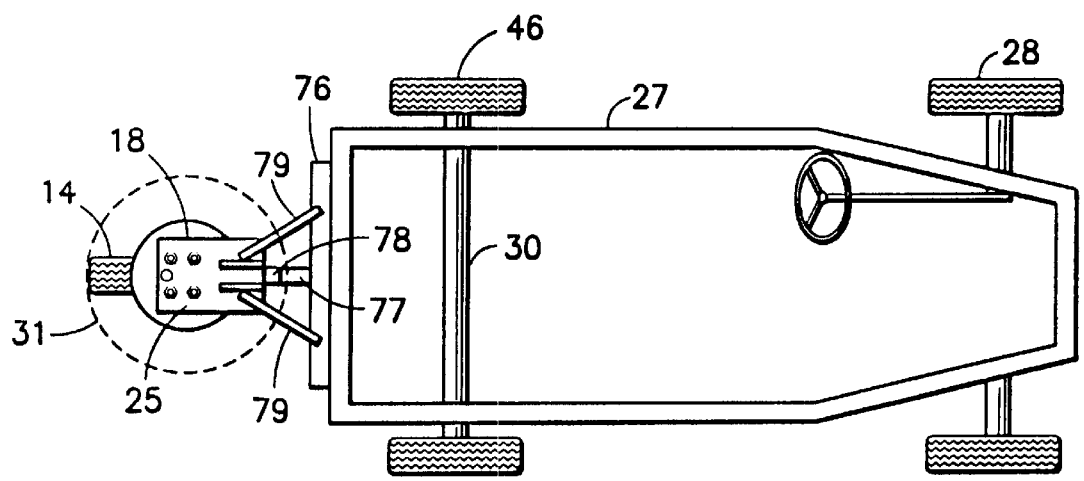
FIG. 8 is a top plan view showing an alternate embodiment to provide a castering wheel mounted to the automotive frame by means of a conventional trailer hitch.

An alternate means for attaching the castering apparatus 11 to a car 10 is shown in FIG. 8 by means of attaching a conventional trailer hitch 76 to the frame 27 whereby a hitch tongue 78 is attached to the support plate 25 and inserted into the receiver channel 77 of the trailer hitch 76. Rotational torque of the castering apparatus 11 is stabilized by bars 79 attached to the support plate 25 and the hitch 76. Insertion of the tongue 78 into the receiver 77 is designed to allow the castering apparatus 11 to elevate the rear tires 46 from contact with the road surface, therefore leaving the rear of the car to be acted upon by the castering effect of the apparatus of the invention. There can be two receiver channels 78 located on the trailer hitch 76 to accommodate two castering apparatus 11 if more support is desired. Furthermore, the receiver channels can be attached to the rear axle 30 of the car's frame 27 to receive the tongue 78 of the castering apparatus 11 on either side of the car.

The set-up of a car 10 with the apparatus of the invention and the conducting of training exercises requires only one person. The instructor can drive to a location with all of the necessary components stored in the trunk of the training car. Because the speeds at which the activities are conducted, generally no faster than about 15 m.p.h., are slow, little space is needed and the noise factor of screeching tires that is associated with the current state of the art is minimized to eliminate being a nuisance to the neighbors; therefore, there are many locations that will be suitable and available. Any parking lot with 30 or 40 empty spaces would be adequate.

Figure 10:
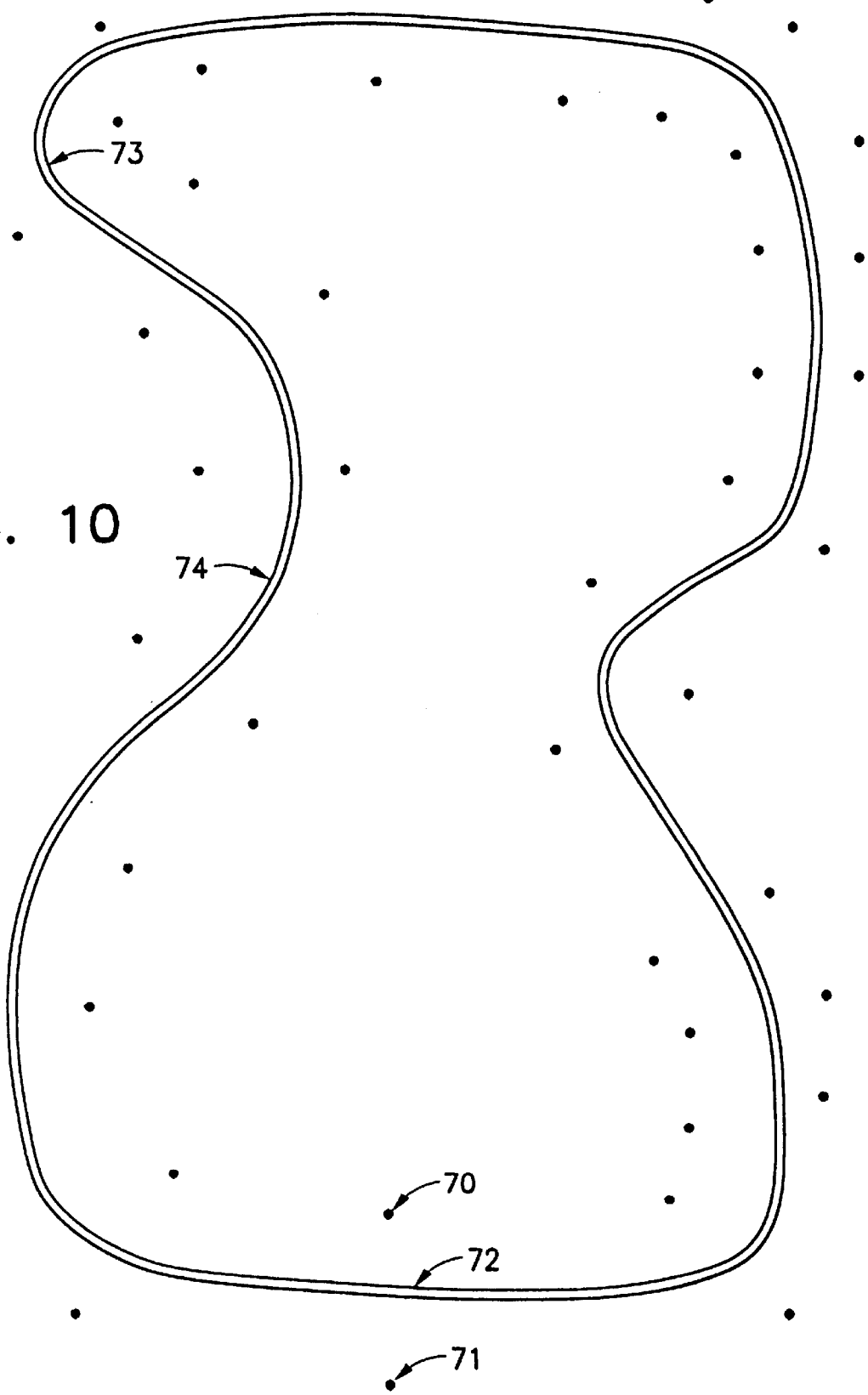
FIG. 10 is a top view of a traffic cone configuration to show one type of course layoff to be used for training activities.

Once the instructor arrives at the training site, the components of the apparatus of the invention are removed from the trunk. The car is jacked up and the rear wheels are removed, one at a time, and replaced with the castering assembly 11. The portable plate 12 for the hydraulic brake system is placed on the front floor of the passenger side of the car. The fluid lines 22 are connected to the quick connects 56, 57. Six inch high traffic cones are laid out into the configuration for the intended activities such as the sample shown in FIG. 10. The inside cones 70 and the outside cones 71 are spaced sixteen feet apart. Having this width is a representation of one lane of a wide two lane roadway; this width gives the trainee opportunities to drive proper and improper lines into the various small radius curves 73 and the large radius curves 74.

Figure 3:
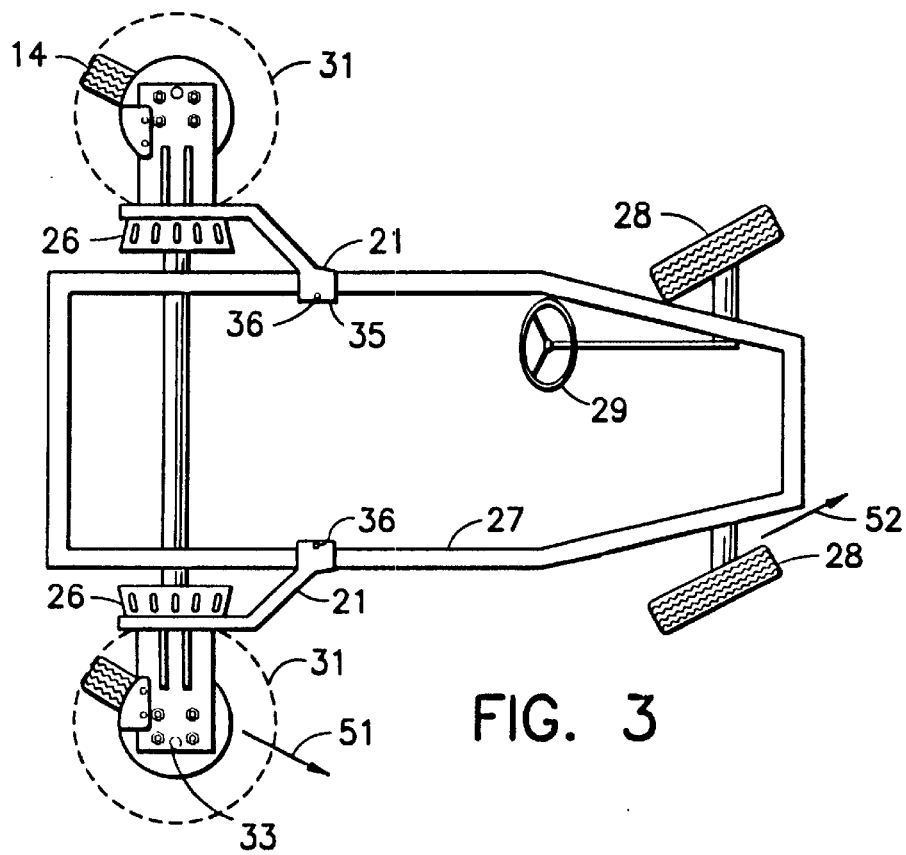
FIG. 3 is a top plan view showing an alternate embodiment to provide a locked or free castering wheel with a manual locking mechanism and it shows the effect turning has upon the castering wheels.

There are a number of designed activities that the apparatus of this invention can achieve which is not possible by any other known devices. Using the configuration in FIG. 10, an instructor states to the trainee that the objective is to drive as fast as possible without hitting a cone and without spinning out of control and at any point along the course the instructor has the option to release the pressure from the brake pedal 23 which will release the lock upon the rotary disc 18 to free the casters. When the driver steers as shown in FIG. 3 to the left 52, the rear of the car will caster to the right 51 to cause a simulated effect as if the driver hit a patch of ice. A stop watch records the time of each run. The trainee has to read the curves, use the best lane position to gain the largest radius of each curve's drive line, know how much acceleration is manageable for the straight stretches and how much reduction must take place at each of the various curves. When a "patch of ice" breaks the rear end away from its longitudinal tracking path, a corrective steering action must be made instantly before the yaw exceeds a 25 degree angle. The trainees learn how to recognize the skid yaw at a time when it could be controlled. They also learn that an excessive speed of only a few miles an hour will cause even the driver with the best techniques and quickest reaction to spin out of control. The drivers learn that speed on the approach is the most important concept to achieve consistent control. The high-risk and competitive driver will not gain a good time for their runs through the course unless they use effective lane position, speed control, searching techniques, and skid recovery techniques.

This invention can be used by police departments, civic groups, driver training facilities and other groups, companies, and organizations to give drivers opportunities to experience what it feels like to lose control of a vehicle and what is needed to avoid the same while on an actual roadway. These groups and organizations, especially the police departments, can conduct drunk driving demonstrations by having drivers of drinking age perform the course activities before drinking and then allow the participants to drink enough so they are registering a blood-alcohol-level of about 0.05 as measured by a breathalyzer. The participant performs the course again, and the time of the run is record. More alcohol is consumed to a blood-alcohol-level of about 0.08–0.09 and the course is driven again. Most drivers will experience a significant increase in the amount of time it takes to successfully complete the course and more failures and wiped-outs as the level of risk increases in proportion to the level of alcohol.

The above described activities are not to limit the scope of the invention but are intended to serve as a few examples of how the apparatus of the invention can be used to increase the educational experience of drivers.

Figure 11A:
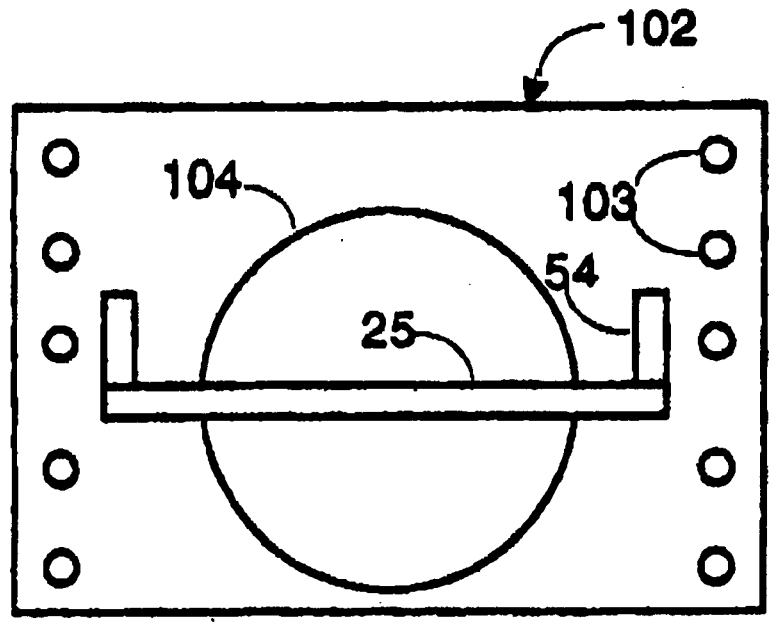
FIGS. 11a and 11b are plan views showing a mounting plate and universal vertical plate according to a modification of the invention.
Figure 11B:
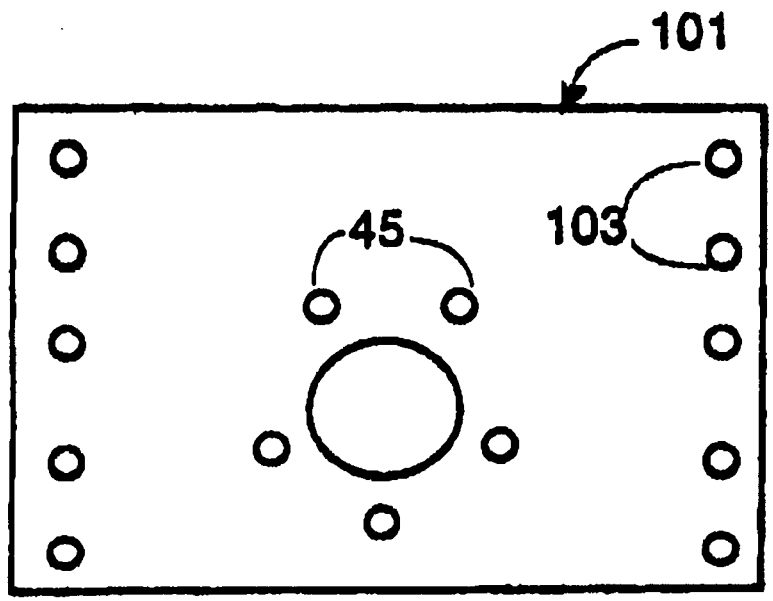

A number of other alterations, modifications and/or additions may be employed in the apparatus of the invention. Thus, as shown in FIGS. 11a and 11b, a mounting plate 101 of the type generally described above may be used in conjunction with a universal vertical plate 102 to enable the apparatus to be mounted to the rear brake drum of the vehicle. The horizontal plate 25 described hereinabove is welded to the universal vertical plate 102 as shown in FIG. 11a. The design of the universal vertical plate 102 allows it to be mated, by the use of ten bolts 103, to the mounting plate 101. Once the vertical plate 102 and the mounting plate 101 are bolted together, they can be attached to the vehicle by bolts passing through the lug holes 45 of the mounting plate 101 which are exposed by a circular cutout 104 on the universal plate. With the use of this universal vertical plate 102, a single apparatus according to the invention will, when mated with a mounting plate, be able to be used on any front wheel vehicle. The mounting plate 101 is designed to match the lug stud pattern of the vehicle to be used. One pair of apparatus of the invention along with different mounting plates 101 can be fitted to several vehicles which will add to the flexibility of operation and to the reduction of cost.

Figure 12:
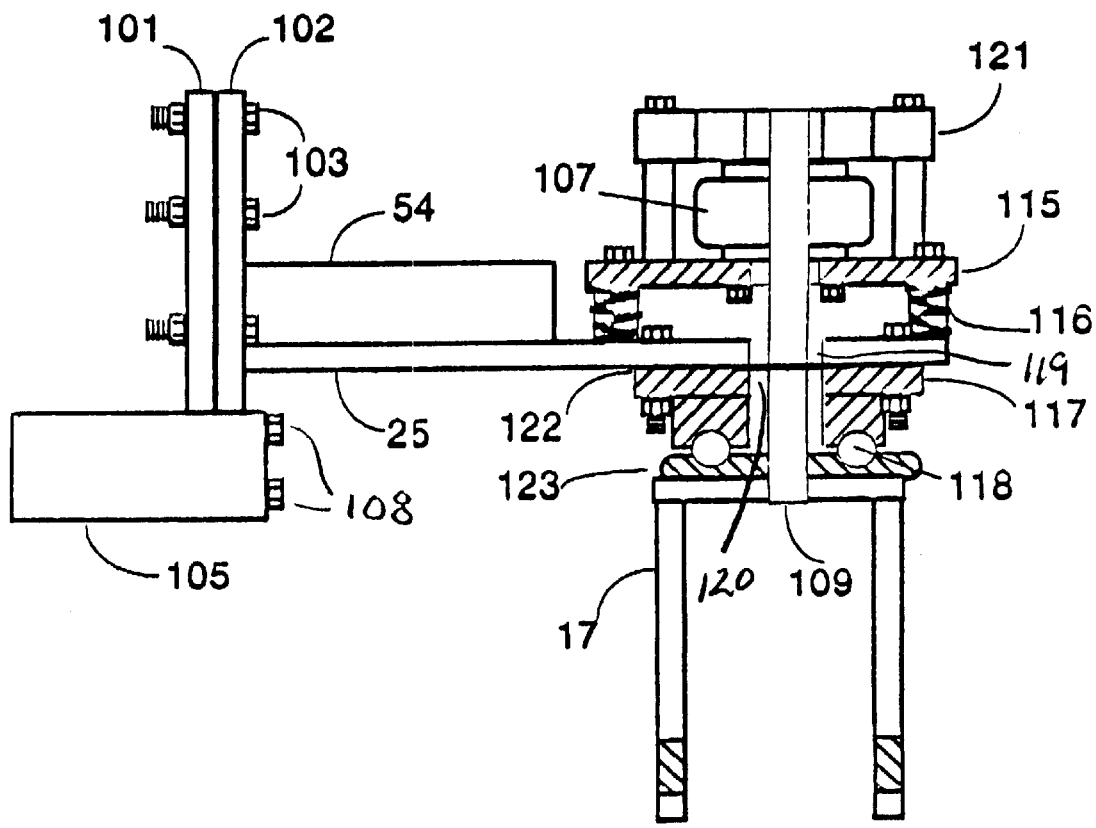
FIG. 12 is an elevated side view of the apparatus of the invention employing an electromagnetic brake assembly.
Figure 13:
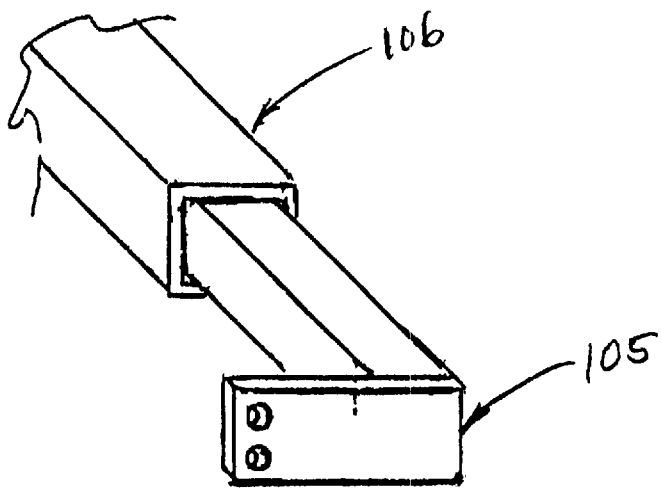
FIG. 13 is a perspective view of a further modification employing a removable stabilizer-bracket assembly for mounting the apparatus of the invention to the frame of a vehicle.
Figure 14:
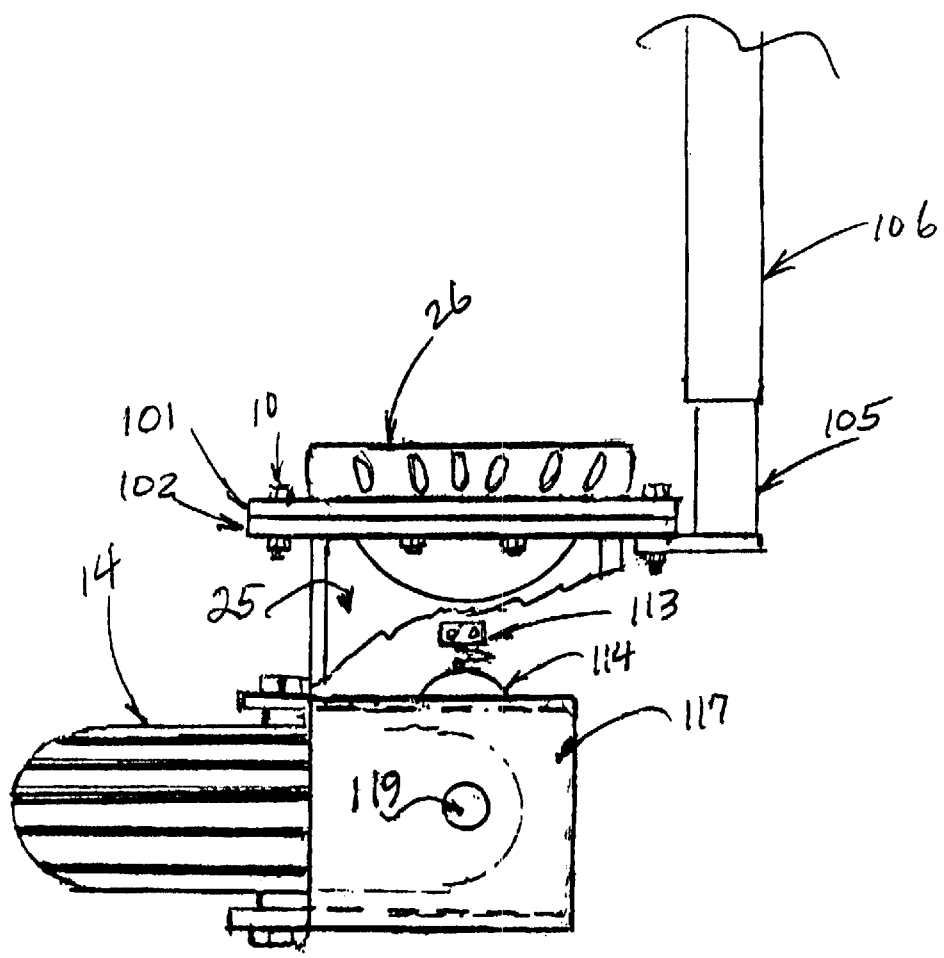
FIG. 14 is a partially cut-away top plan view of the horizontal plate used in an apparatus according to the invention showing a switching system employed to detect when the tires are in a straight position.
Figure 15:
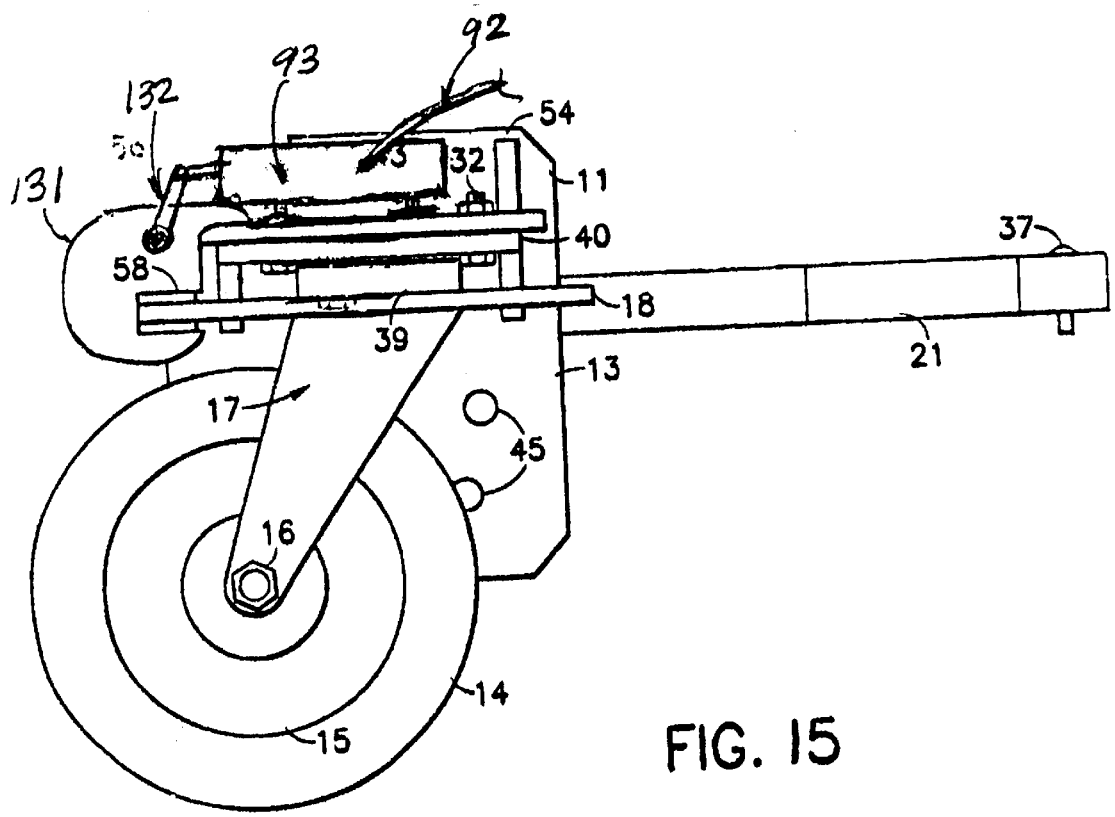
FIG. 15 is a side view similar to FIG. 5 showing an apparatus according to the invention employing a brake caliper actuated by an electrical solenoid.
Figure 16:
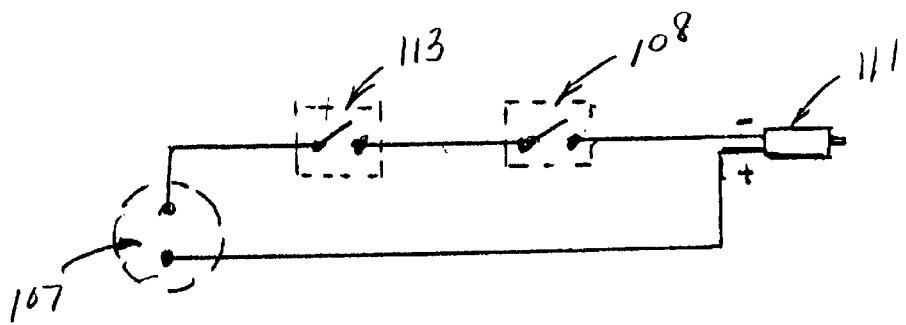
FIG. 16 is a diagram of an electrical circuit for actuating the electromagnetic brake or solenoid assemblies used in the modified apparatus shown in FIGS. 12 and 15, respectively.

To further add to the flexibility of the apparatus, there is provided according to another modification of the invention a stabilizer bracket 105 that is bolted together with the mounting plate 101 and the universal vertical plate 102 via the bolts 103 as shown in FIG. 12. The stabilizer bracket 105 fits into a section of hollow square tubing 106 as shown in FIG. 13 that is anchored to the automobile's axle or control arm to prevent the castering assembly from rotating on the rear axle. The stabilizer bracket 105 is then bolted to the mounting plate 101 via the bolts 108, rather than providing the combination as a single welded unit. By bolting the stabilizer bracket 105 in this manner, one mounting plate can be used for several different models of a manufacturer's vehicles with only the need to make a new stabilizer bracket, further adding to the flexibility of the unit at cost reduction savings. By use of the design employing the universal vertical plate 102 and the mounting plate 101, one is able to mix and match various units to use one unit for the driver's side or for the passenger's side if needed. The purchase of one extra assembly can be kept as a spare to fit either side of the car if there is a need to make a quick replacement while a training session is being conducted.

The stabilizer bracket 105 is designed to fit into the tubing 106 that is mounted to the vehicle as shown in FIG. 13. The mounted bracket is removable when the car is no longer to be used for training purposes. The mounted bracket can remain on the vehicle without interfering with, nor compromising, any safe on-street performance of the vehicle.

An electromagnetic brake 107 can be used to lock the castering wheels according to another modification of the invention as shown in FIG. 12. The electromagnetic brake 107 is operated by 12 volts of direct current with less than about 10 amperes of current. The instructor, from inside a moving vehicle, can push a switch 108 to lock the castering wheels in a straight-ahead position and release the lock to allow the castering action. One side of the electromagnetic brake 107 is attached to the rotating shaft 109 of the castering wheel; the other side of a electromagnetic brake is attached to a fixed part 110 of the apparatus of the invention. When current is applied to the electromagnetic brake 107, two hundred foot-pounds of force will be applied to fix the tires in a straight-ahead position, thereby preventing the tires from castering. Use of a 12 volt system, at a low current of about 4.5 amperes, makes it possible to put the electrical system into operation by plugging an adaptor 111 into the vehicle's cigarette lighter outlet. This adds to the portability of the apparatus of the invention. A switching system will automatically detect when the tires are in the straight position before reapplying the locking force of the electromagnetic brake. To accomplish such, a micro switch 113 will be actuated by a cam or protuberance 114 (or an electromagnetic read switch) to detect when the castering tires are in the straight ahead position before allowing the electromagnetic brake to be actuated in a locked position.

The electromagnetic brake is mounted on a platform 115 that is attached to the horizontal plate 25 by compression springs 116, or other resilient material, to serve as a shock absorber. By use of a spring loaded mounting plate, the shaft 109, attaching the caster to the electromagnetic brake 107, will have freedom to move to prevent the play in the castering assembly from placing a destructive side load on the bearings within the electromagnetic brake assembly.

A swivel caster assembly such as that disclosed in U.S. Pat. No. 4,316,305 may be provided consisting of a stationary base member 117, and a rotatable load-supporting wheel fork 123 with a ball bearing arrangement 118 supporting the wheel assembly. This caster assembly can be modified to have the shaft 109 welded to the rotatable load-support. The attached shaft 109 extends through a clearance hole 119 in the stationary base member 117 and through a clearance hole 120 in the horizontal plate 115 to receive the electromagnetic brake. The welded shaft can also receive a known type of viscous damper such as that disclosed in U.S. Pat. No. 4,432,254. A rubber gasket 122 is fitted around the shaft and located between the clearance hole of the stationary base 117 and the clearance hole of the horizontal plate 115 will function as a seal to retain grease in the ball bearings of the castering unit and also prevent debris from contaminating the ball bearings.

In a further modification of the invention, the apparatus as described hereinabove is preferably provided with 6 ply aircraft pneumatic tires 500×5. The structure and size of the tire are important to the successful operation of the apparatus. The strength of the tire's sidewalls must be strong enough to withstand the lateral forces that occur when a quick lane change is made while the castering wheels are in the locked position. Aircraft tires withstand 250 foot pounds of torque. An important factor for the use of the 500×5 aircraft type tire is the size of its diameter. The tire must be strong enough to withstand the lateral forces of operation as well as to be able to caster 360 degrees without striking any part of the vehicle. When a larger size tire than 500×5 is used, the tires would need to be located a greater distance laterally from the vehicle in order to clear the bottom of the rear drum 26 or brake disk or the horizontal plate would need to be welded lower on the universal plate which will make the vehicle's rear end pitch upward. Neither of these two conditions are desirable, and both are avoided by the use of a 500×5 aircraft type tire.

Other modifications and additions are of course possible and can be used without departing from the spirit and scope of the invention as will readily occur to those skilled in the art.

What is claimed is:

1. A front wheel drive automotive vehicle for simulating speed control having at least one rear wheel assembly comprising a rigid support, means for securing said support to said vehicle, a castering wheel mounted to said support and pivotable about an axis, a locking member axially mounted to and rotatable with said castering wheel, means for restricting rotation of said locking member and said castering wheel and means for releasing said restricting means to simulate excessive speed resulting in a skid producing condition, said means for securing said rigid support to said vehicle comprising a mounting plate, said mounting plate including means for attaching said plate to said vehicle, a universal plate attached to said rigid support, said universal plate being juxtaposed to said mounting plate and including an opening for providing access to said attaching means on said mounting plate and means for removably securing said universal plate to said mounting plate.

2. A front wheel drive automotive vehicle according to claim 1, wherein said means for releasing said restricting means is located at a position remote from said wheel assembly.

3. A front wheel drive automotive vehicle according to claim 2, wherein said locking member is a rotary disc and wherein said means for restricting rotation of said disc comprises a brake caliper.

4. A front wheel drive automotive vehicle according to claim 3, wherein said means for releasing said rotary disc comprises a combined actuator and hydraulic fluid supply.

5. A front wheel drive automotive vehicle according to claim 4, wherein said actuator is a brake pedal and wherein said fluid supply is a master cylinder.

6. A front wheel drive automotive vehicle according to claim 2, wherein said locking member is a rotary plate having an aperture therein and wherein said means for restricting rotation of said rotary plate comprises a pin passing through said support and said aperture in said plate.

7. A front wheel drive automotive vehicle according to claim 6, wherein said means for releasing said rotary plate comprises a solenoid attached to said pin and an electrical circuit including an actuating switch located at said remote position.

8. A front wheel drive automotive vehicle according to claim 7, wherein said circuit includes a second switch and wherein said wheel assembly further includes means attached to said castering wheel for actuating said second switch when said castering wheel is placed in a straight position relative to said vehicle.

9. A front wheel drive automotive vehicle according to claim 8, wherein said vehicle includes a d.c. power supply and a cigarette lighter and wherein said circuit is connected to said power supply by an adaptor plug removably fitting within said cigarette lighter.

10. A front wheel drive automotive vehicle according to claim 2, wherein said locking member is a rotary shaft and wherein said means for restricting rotation of said shaft comprises an electromagnetic brake.

11. A front wheel drive automotive vehicle according to claim 10, wherein said means for releasing said rotary shaft comprises an electrical circuit connected to said electromagnetic brake and including an actuating switch located at said remote position.

12. A front wheel drive automotive vehicle according to claim 11, wherein said circuit includes a second switch and wherein said wheel assembly further includes means attached to said castering wheel for actuating said second switch when said castering wheel is placed in a straight position relative to said vehicle.

13. A front wheel drive automotive vehicle according to claim 12, wherein said vehicle includes a d.c. power supply and a cigarette lighter outlet and wherein said circuit is connected to said power supply by an adaptor plug removably fitting within said outlet.

14. A front wheel drive automotive vehicle according to claim 1, wherein said vehicle further includes a frame, a rear axle affixed to said frame and a brake drum mounted to said rear axle, said brake drum including a plurality of stud bolts arranged in a circular pattern for mounting a wheel thereto and wherein said attaching means on said mounting plate includes a plurality of holes mating with said stud bolts, the arrangement being such that said stud bolts are accessible through said opening in said universal plate.

15. A front wheel drive automotive vehicle according to claim 14, further including a stabilizer bracket attached to said mounting plate and removeably fitting within a hollow tubing secured to said frame.

16. A wheel assembly for attaching to the rear wheel axle of a front wheel drive automotive vehicle for simulating effects of excessive speed, said rear wheel axle having a brake drum affixed thereto, said wheel assembly comprising a rigid support, means for securing said support to said brake drum, a castering wheel mounted to said support and pivotable about an axis, a rotary shaft axially mounted to and rotatable with said castering wheel, an electromagnetic brake mounted to said support and around said shaft for restricting rotation of said shaft and said castering wheel and an electrical circuit including a switch for releasing said electromagnetic brake from a remote location to simulate excessive speed resulting in a skid producing roadway condition.

17. A wheel assembly according to claim 16 wherein resilient means are interposed between said electromagnetic brake and said rigid support.

18. A wheel assembly according to claim 16, further including an aircraft pneumatic tire 500×5 rotatably mounted to said castering wheel.

* * * * *